United States Patent
Worman et al.

(10) Patent No.: US 12,196,558 B2
(45) Date of Patent: Jan. 14, 2025

(54) SENSOR PACKAGE FOR INFRASTRUCTURE DATA COLLECTION

(71) Applicant: The Regents of the University of Michigan, Ann Arbor, MI (US)

(72) Inventors: Tyler S. Worman, Ypsilanti, MI (US); Gregory J. McGuire, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 47 days.

(21) Appl. No.: 17/671,045

(22) Filed: Feb. 14, 2022

(65) Prior Publication Data
US 2022/0260375 A1    Aug. 18, 2022

Related U.S. Application Data

(60) Provisional application No. 63/200,098, filed on Feb. 13, 2021.

(51) Int. Cl.
*G01C 21/26* (2006.01)
*G01S 19/14* (2010.01)

(52) U.S. Cl.
CPC .............. *G01C 21/26* (2013.01); *G01S 19/14* (2013.01)

(58) Field of Classification Search
CPC ..................................................... G01C 21/26
See application file for complete search history.

(56) References Cited

U.S. PATENT DOCUMENTS

| | | | |
|---|---|---|---|
| 2010/0283832 A1* | 11/2010 | Lin ..................... | G06F 18/256 348/46 |
| 2015/0241220 A1* | 8/2015 | McKitterick ...... | G01C 21/1652 701/400 |
| 2016/0209511 A1* | 7/2016 | Dolinar ............... | G06V 20/588 |
| 2019/0063943 A1* | 2/2019 | Sunil Kumar ......... | G05D 1/027 |
| 2021/0294331 A1* | 9/2021 | Nickel ................. | B60W 10/20 |

FOREIGN PATENT DOCUMENTS

CA            2733032 A1 *  8/2012  ........... G01C 21/165

* cited by examiner

*Primary Examiner* — Jean Paul Cass
(74) *Attorney, Agent, or Firm* — Reising Ethington P.C.

(57) ABSTRACT

A sensor package and associated method provides roadside sensor-based data. The sensor package includes a controller, a network access device for remote communications, GNSS receiver, an inertial measurement unit (IMU), and environment sensors. The controller operates under software control and communicates with the other sensor package devices to: collect environment sensor data using the sensors; receive GNSS signals indicating current sensor package location; obtain IMU data; determine position/orientation data that includes position data and orientation data based on the orientation data is based on the IMU data; and send the environment sensor data and the position/orientation data of the sensor package to an external device using the network access device. The environment sensor data includes at least one sensor data frame, and the sensor data frame is matched with position/orientation data based on a time associated with collecting the sensor data frame and the position/orientation data.

4 Claims, 8 Drawing Sheets

SENSOR PACKAGE FOR INFRASTRUCTURE DATA COLLECTION

TECHNICAL FIELD

This invention relates to methods and systems for obtaining sensor information at one or more sensors that are provided along a road.

BACKGROUND

With the rise of connected vehicles (CVs) and autonomous vehicles (AVs) and, in particular, with connected autonomous vehicles (CAVs), there has been a concomitant increase in the development and installation of various types of roadside equipment (RSE) that enables vehicle to infrastructure (V2i) communication. This enables vehicle information to be shared with the public transportation infrastructure as well as with private industry that supports enhanced vehicle and third party provider services.

SUMMARY

Beyond V2i communication, the inventors have discovered a need for providing a variety of RSE-based environmental data along roadways and at intersections so as to support AV testing and development.

Thus, in accordance with an aspect of the invention, there is provided a method for obtaining environment sensor data and position/orientation data from a sensor package, wherein the sensor package comprises a housing that houses:
  a controller having a processor and memory storing computer instructions;
  a network access device including hardware enabling wireless communications and that is communicatively coupled to the controller;
  a global navigation satellite system (GNSS) receiver communicatively coupled to the controller and to a GNSS antenna;
  an inertial measurement unit (IMU) communicatively coupled to the controller;
  at least one environment sensor that is communicatively coupled to the controller and that is configured to collect environment sensor data, and
wherein the method comprises the steps of:
  receiving an indication to collect environment sensor data at the sensor package;
  collecting the environment sensor data at the sensor package using the at least one environment sensor;
  receiving GNSS signals at the sensor package using the GNSS receiver;
  obtaining IMU data using the IMU;
  determining position/orientation data that includes position data and orientation data, wherein the position data is based on the received GNSS signals, and wherein the orientation data is based on the IMU data; and
  sending the environment sensor data and the position/orientation data of the sensor package to an external device using the network access device, wherein the environment sensor data includes at least one sensor data frame, and wherein the sensor data frame is matched with position/orientation data based on a time associated with collecting the sensor data frame and the position/orientation data.

In this way, various time-stamped environmental and other sensor data may be collected from one or more substantially fixed locations along a roadway, whether at a vehicle test facility or along a public road.

In accordance with another aspect of the invention there is provided a method for merging sensor data from sensors of a first sensor package and a second sensor package, wherein the first sensor package and the second sensor package each comprises a housing that houses:
  a controller having a processor and memory storing computer instructions;
  a network access device including hardware enabling wireless communications and that is communicatively coupled to the controller;
  a global navigation satellite system (GNSS) receiver communicatively coupled to the controller and to a GNSS antenna;
  an inertial measurement unit (IMU) communicatively coupled to the controller;
  at least one environment sensor that is communicatively coupled to the controller and that is configured to collect environment sensor data, and
wherein the method comprises the steps of:
  collecting first environment sensor data using the at least one environment sensor at the first sensor package, wherein the first environment sensor data includes a first sensor data frame;
  collecting second environment sensor data using the at least one environment sensor at the second sensor package, wherein the second environment sensor data includes a second sensor data frame, wherein the first sensor data frame and the second sensor data frame are time-associated with one another;
  determining first position/orientation data that includes first position data and first orientation data for the first sensor package, wherein the first position data is based on GNSS signals received at the first sensor package, and wherein the first orientation data is based on IMU data received at the first sensor package;
  determining second position/orientation data that includes second position data and second orientation data for the second sensor package, wherein the second position data is based on GNSS signals received at the second sensor package, and wherein the second orientation data is based on IMU data received at the second sensor package; and
  merging the first sensor data frame with the second sensor data frame based on the first position/orientation data and the second position/orientation data so as to generate composite environment sensor data that provides environment sensor data representing a common region within the environment from multiple perspectives.

And in accordance with yet another aspect of the invention, there is provided a sensor package which may be used to carry out the methods. The sensor package includes having a housing that houses:
  a controller having a processor and memory storing computer instructions;
  a network access device including hardware enabling wireless communications and that is communicatively coupled to the controller;
  a global navigation satellite system (GNSS) receiver communicatively coupled to the controller and to a GNSS antenna;
  an inertial measurement unit (IMU) communicatively coupled to the controller; and at least one environment sensor that is communicatively coupled to the controller and that is configured to collect environment sensor data, and wherein the computer instructions, when executed by the processor, cause the sensor package to:

receive an indication to collect environment sensor data at the sensor package;

collect the environment sensor data at the sensor package using the at least one environment sensor;

receive GNSS signals at the sensor package using the GNSS receiver;

obtain IMU data using the IMU;

determine position/orientation data that includes position data and orientation data, wherein the position data is based on the received GNSS signals, and wherein the orientation data is based on the IMU data; and send the environment sensor data and the position/orientation data of the sensor package to an external device using the network access device, wherein the environment sensor data includes at least one sensor data frame, and wherein the sensor data frame is matched with position/orientation data based on a time associated with collecting the sensor data frame and the position/orientation data.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION

Figure 1:
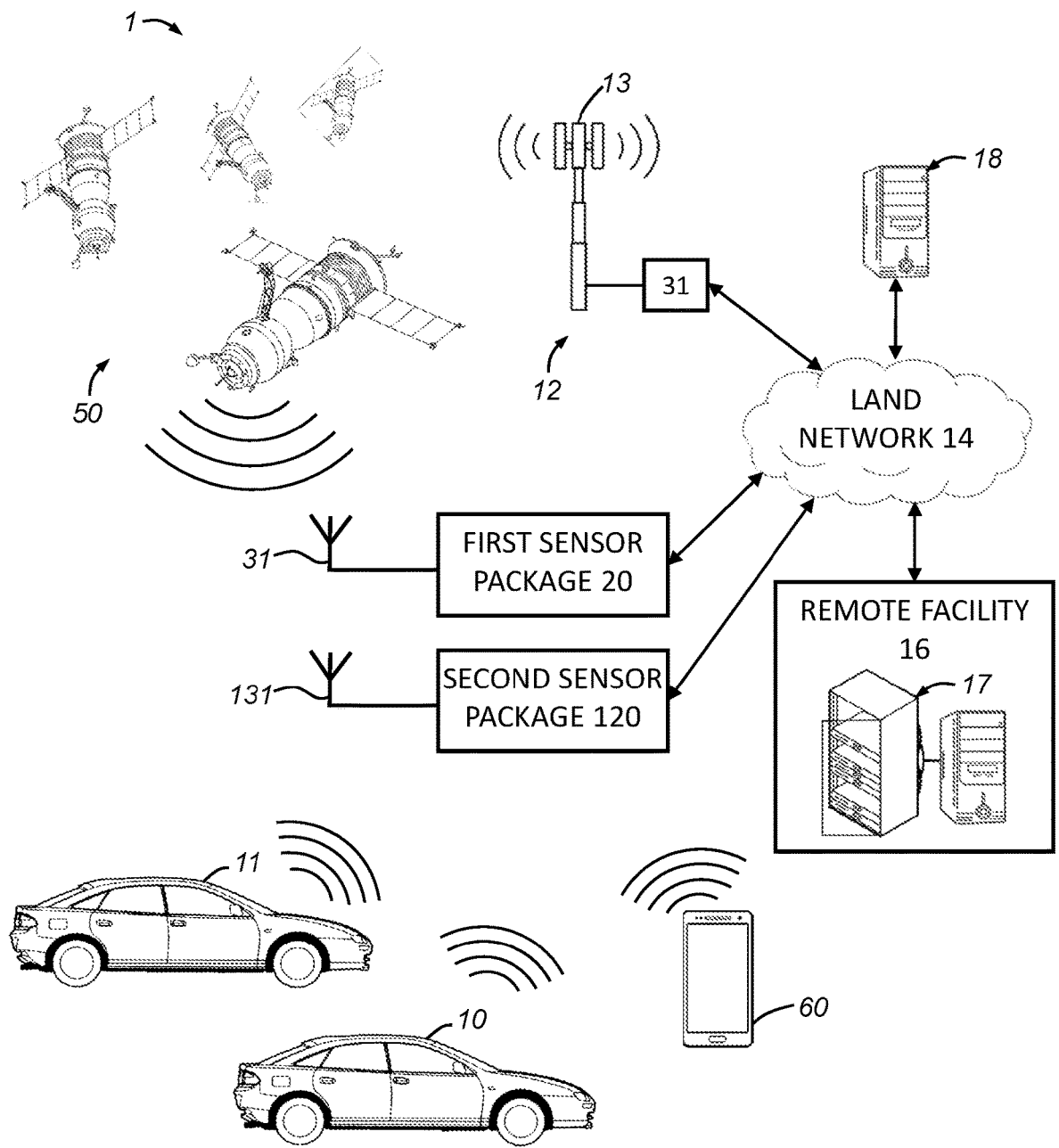
FIG. 1 depicts a communications system that includes a computer-based system and operating environment, including a first and second sensor package, that can be used for carrying out a method for obtaining environment sensor data and position/orientation data from a sensor package.

The system and method described herein enables environment sensor data to be obtained from an environment sensor that is a part of a sensor package and to determine position/orientation data that is time-associated with the environment sensor data. Furthermore, according to some embodiments, the system and method enables environment sensor data obtained from environment sensors of different sensor packages to be merged so as to obtain composite environment sensor data representing a common region within the environment as taken or viewed from multiple perspectives. In some embodiments, each sensor package includes a housing that houses an environment sensor (e.g., lidar device, camera), a global navigation satellite system (GNSS) receiver, an inertial measurement unit (IMU), a controller, and a network access device (NAD). In at least one embodiment, a position (represented as positioned data) of the sensor package is determined based on receiving a plurality of GNSS signals at the GNSS receiver, and an orientation (represented as orientation data) of the sensor package is determined based on IMU sensor data that is obtained by the IMU. The position data indicates a position of the sensor package as taken at a particular time and the orientation data indicates an orientation of the sensor package as taken at a particular time. The position data and the orientation data may together is referred to as position/orientation data. The sensor package also uses the environment sensor (e.g., lidar device, camera) to obtain environment sensor data as taken at a particular time. The environment sensor data is said to be time-associated with the position/orientation data when taken at (or within a predetermined tolerance amount of) the same time as the position data and the orientation data. According to at least some embodiments, the system and method are able to determine the position and orientation that the sensor (or sensor package) was disposed at during the time at which the environment sensor data was taken. Therefore, this environment sensor data and time-associated position/orientation data is useful for a variety of applications, including collecting environment sensor data along one or more roadways for purposes of detecting traffic, such as the position, speed, distance, heading, size, orientation, etc., of one or more objects on or near the roadway(s).

Furthermore, according to some embodiments, environment sensor data obtained at an environment sensor of a first sensor package and environment sensor data obtained at an environment sensor of at a second sensor package is merged so as to generate composite environment sensor data that provides environment sensor data representing a common region within the environment as taken or viewed from multiple perspectives. For example, according to one embodiment, a first sensor package is mounted on a traffic signal pole and a second sensor package is mounted on street light pole such that the sensor field of view of an environment sensor of the first sensor package at least partially overlaps the sensor field of view of an environment sensor of the second sensor package so that both sensor fields of view include a common region. Environment sensor data from each environment sensor of the first and second sensor packages is obtained, then time-associated with position/orientation data, and then merged with one another so as to obtain environment sensor data representing the common region within the environment from multiple perspectives. In at least one embodiment, the environment sensor data from the environment sensors is merged based on or through use of the position and orientation of the sensor packages as indicated by the time-associated position/orientation data.

With reference now to FIG. 1, there is shown an operating environment that comprises a communications system 1 and that can be used to implement the method disclosed herein. Communications system 1 generally includes vehicles 10,11, one or more wireless carrier systems 12, a land communications network 14, a remote processing facility 16, a client device 18, a first sensor package 20, a second sensor package 120, a constellation of GNSS satellites 50, and a mobile client device 60. In some embodiments, the vehicle 10 and/or the vehicle 11 is an autonomous vehicle (AV), and/or the vehicle 10 and/or the vehicle 11 is a connected vehicle (CV). In other embodiments, the vehicle 10 and/or the vehicle 11 is a human-powered vehicle (or not an autonomous vehicle (AV)) and/or the vehicle 10 and/or the vehicle 11 is not a connected vehicle (CV). As used herein, a connected vehicle (CV) is a vehicle that is capable of carrying out data communications with a remote server, such as one or more remote servers 17 that are located at the remote facility 16. As used herein, an autonomous vehicle (AV) is a vehicle that is categorized as a Level 2 or higher according to the National Highway Traffic Safety Administration (NHTSA) or Society of Automotive Engineers (SAE) standard J 3016-2018. In some embodiments, the vehicles 10, 11 can be a Level 3 (or higher), a Level 4 (or higher), or a Level 5 (or higher). Vehicle-to-infrastructure (V2I) communications include communications that can be carried out between vehicles and the sensor packages 20, 120 (or other roadside equipment (RSE)), as well as communications between vehicles and remote networks, such as communications between the vehicles 10, 11 and the remote facility 16. It should be understood that the disclosed method can be used with any number of different systems and is not specifically limited to the operating environment shown here. Also, the architecture, construction, setup, and operation of the system 1 and its individual components are generally known in the art. Thus, the following paragraphs simply provide a brief overview of one such communications system 1; however, other systems not shown here could employ the disclosed method as well.

Wireless carrier system 12 may be any suitable cellular telephone system. Carrier system 12 is shown as including a cellular tower 13; however, the carrier system 12 may include additional cellular towers as well as one or more of the following components (e.g., depending on the cellular technology): base transceiver stations, mobile switching centers, base station controllers, evolved nodes (e.g., eNodeBs), mobility management entities (MMEs), serving and PGN gateways, etc., as well as any other networking components required to connect wireless carrier system 12 with the land network 14 or to connect the wireless carrier system with user equipment (UEs, e.g., which include telematics equipment in vehicles 10,11), all of which is indicated generally at 31. Carrier system 12 can implement any suitable communications technology, including for example GSM/GPRS technology, CDMA or CDMA2000 technology, LTE technology, etc. In general, wireless carrier systems 12, their components, the arrangement of their components, the interaction between the components, etc. is generally known in the art.

The land network 14 may be a conventional data communications network that provides connectivity to between remote devices, and that can be used to connect the wireless carrier system 16 to one or more networks or devices that are remote to one another, such as the sensor packages 20,120 and the one or more remote servers 17. In one embodiment, the land network 14 includes a packet-switched data communications network that is used to provide access to Internet infrastructure. One or more segments of the land network 14 may be implemented through the use of a standard wired network, a fiber or other optical network, a cable network, power lines, other wireless networks such as wireless local area networks (WLANs), or networks providing broadband wireless access (BWA), or any combination thereof.

Remote facility 16 may be designed to provide the vehicle electronics of any CVs, mobile client device 60, and/or other wirelessly connected devices (WCDs) (i.e., a device that is capable of communicating data with a remote network, such as a remote server at the remote facility 16) with a number of different system back-end functions. The remote facility 16 represents one or more remote facilities that house servers, memory, or other computing equipment that is used to carry out various functionality described herein. Although a single remote facility is referred to herein, it should be appreciated that one or more remote facilities can be used to implement the various backend (or off-board) functionality discussed herein.

The remote facility 16 may include various components and may include a wired or wireless local area network. The remote facility 16 includes the one or more remote servers 17. The one or more remote servers 17 each include a processor and memory. The memory can store computer instructions that, when executed, carry out various functionality, such as one or more of the method steps discussed herein, to be carried out, at least according to some embodiments. In one embodiment, the one or more remote servers 17 support an API interface that is used to provide the client device 18 with control of one or more components of the sensor packages 20,120 and/or to receive environment sensor data, position/orientation data, and/or other sensor package information from the sensor packages 20,120. In such embodiments, this server is referred to as an API server. The remote facility 16 can also include other computers or computing devices, as well as other memory, databases, etc. Generally, the remote facility 16 may receive and transmit data via a modem connected to land network 14. At the remote facility 16, data transmissions may also be conducted by wireless systems, such as IEEE 802.11x, GPRS, and the like. In one embodiment, the remote facility 16 may be used to implement at least part of one or more methods disclosed herein. A database at the remote facility 16 can store sensor package information (e.g., position data (e.g., GNSS data), orientation data (e.g., IMU data), environment sensor data), vehicle information, and/or various other types of data. The sensor package information is any information pertaining to a sensor package (e.g., the first sensor package 20, the second sensor package 120) and can include, for example, sensor data obtained from one or more sensors of the sensor package 20,120 and/or GNSS data of the sensor package 20,120. The vehicle information can include any information pertaining to the vehicles 10,11, and can include, for example, sensor data obtained from one or more onboard sensors of the vehicles 10,11, and/or GNSS data of the vehicles 10,11.

In one embodiment, the one or more remote servers 17 implements an application programming interface (API) server that supports an API enabling the client device 18 to interface with one or more of the sensor packages 20,120. In one embodiment, the interfacing enabled by the API provides sensor data of the sensor package 20,120 for viewing or processing by a user at a client device 18. Additionally or alternatively, the API server enables the user of the client device 18 to set certain sensor parameters of one or more environment sensors of the sensor package 20,120. For example, the API server can provide an interface to a user at the client device 18 that enables the user to specify a sampling or frame rate of one or more environment sensors, a sampling start time of one or more environment sensors, and/or a sampling end time of one or more environment sensors. Additionally, in some embodiments, the API server enables the user of the client device 18 to set certain parameters of the GNSS receiver 30, the IMU 32, or other component of the sensor package 20,120.

The client device 18 is used to provide an API user interface to a user. The client device 18 is illustrated as a personal desktop computer, but it should be appreciated that various computing devices can be used as the client device 18 including, for example, a personal mobile device (e.g., a smartphone, a tablet, a laptop). The client device 18 includes a processor and memory, and hardware enabling the device 18 to carry out communications with remote networks, such as the remote facility 16. According to at least some embodiments, the client device 18 includes one or more human-machine interfaces (HMIs), such as, for example, a computer screen or monitor, a computer mouse, a keyboard, a microphone, and/or a speaker. According to at least one embodiment, the client device 18 executes a client application that is used to display a graphical user interface (GUI) that is used for providing a means for the user to interact with the API that is hosted by the API server. The client device (and/or GUI) can receive input from the user at the client device 18, as well as present data and/or other information of the sensor package (and/or of other components of the proving grounds) to the user. In one embodiment, the client application can be a web application that is executed by a web browser of the client device 18, and the code embodying the client application (and which may be used to provide the GUI) can be provided by the API server in response to a request from the client device. The request can be received in response to a user navigating to a particular domain or electronic address (e.g., IP address) using the browser of the client device 18, and/or the request may be generated in response to authenticating the user for access to the API or API server. In another embodiment, the client application can be downloaded to the client device 18 and then executed using an operating system of the client device 18. The client application can be downloaded from a remote computer, such as a remote computer located at the remote facility 16 or other location remote from the client device 18. In some embodiments, the client application is downloaded from a digital distribution platform, such as the iOS App Store™, Google Play™, etc.

The mobile client device 60 is client device and that is carried by a user. The mobile client device 60 is illustrated as a smartphone; however, other mobile client devices can be used, such as tablets, laptops, smartwatches, etc. The mobile client device 60 may be used to provide an API user interface to a user, such as that which is discussed above. The mobile client device 60 enables a user to have access the sensor package information and/or to control operation(s) of the sensor packages through use of the API user interface. This enables a user to move around and inspect the area in which system is being used while still being able to access and control the sensor package(s). The mobile client device 60 includes a wireless chipset for carrying out wireless communications, such as cellular communications. The mobile client device 60 can also include short-range wireless communication (SRWC) circuitry enabling SRWC technologies to be used to send and receive SRWC messages.

Vehicles 10,11 are each depicted in the illustrated embodiment as a passenger car, but it should be appreciated that any other vehicle including motorcycles, trucks, sports utility vehicles (SUVs), recreational vehicles (RVs), bicycles, other vehicles or mobility devices that can be used on a roadway or sidewalk, etc., can also be used. The vehicles 10,11 are vehicles that are travelling on the proving grounds (or other region) in which the sensor packages 20,120 are located, or that are travelling in an area adjacent to a location in which the sensor packages 20,120 are located. The vehicles 10,11 may be vehicles under test, or may be environmental objects that are present as a part of the environment during a test. As mentioned above, the vehicles 10,11 can each be connected vehicles (CVs) and can include a network access device (NAD) (and/or other hardware) that enables data to be communicated between the vehicle and a remote network, such as the remote facility 16. The vehicles 10,11 can each include one or more controllers, environment sensors, GNSS receiver(s), inertial measurement units (IMUs), and other electronic devices as a part of its vehicle electronics. The vehicles 10,11 can also receive test parameters or instructions used as a part of operating the vehicle during one or more tests. The test parameters or instructions can be specified by a user at the client device 18 or a file stored at the remote facility 16.

Figure 2:
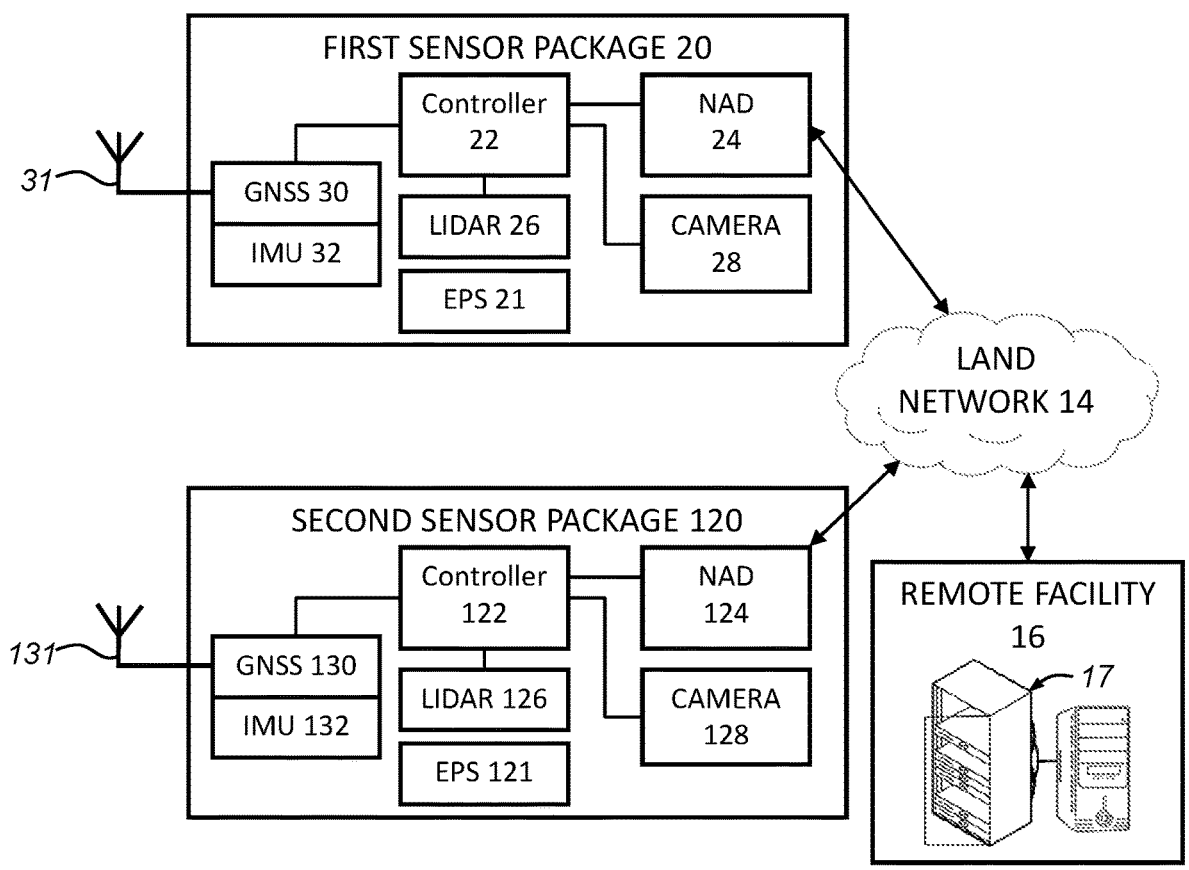
FIG. 2 depicts a block diagram illustrating various components of the first and second sensor packages according to the embodiment of FIG. 1.

With reference to FIG. 2, there is shown components of the first sensor package 20 and of the second sensor package 120. It should be appreciated that the illustrated embodiment depicts the first sensor package and second sensor package as being separate sensor packages, but having the same composition of components, which includes an electric power subsystem (EPS) 21,121, a controller 22,122, a network access device (NAD) 24,124, a lidar device 26,126, a camera 28,128, a global navigation satellite system (GNSS) receiver 30,130 having a GNSS antenna 31,131, and an inertial measurement unit (IMU) 32,132. It should be appreciated that, according to other embodiments, the first sensor package and the second sensor package can include additional or different components, such as one or more other types of sensors (either in addition to or in lieu of those illustrated). Moreover, although the illustrated embodiment depicts the first sensor package and second sensor package as having the same composition of components, according to other embodiments, the first sensor package and the second sensor package can include different types, number, and/or arrangement of components.

According to at least some embodiments, the controller 22,122 includes a processor and memory, and can be configured to operate the sensor package 20,120 for example, by carrying out various operations. The memory device of the controller 22,122 can be a memory management unit (MMU) and/or a non-volatile memory device, which can include powered temporary memory and/or any suitable non-transitory, computer-readable medium such as different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, and/or other suitable memory. In at least some embodiments, the controller 22,122 is used to control and/or carry out various functionality of the sensor packages, such as, for example, packaging environment sensor data and/or position/orientation data for transmission, time-associating environment sensor data and/or position/orientation data, carrying out one or more steps of the method(s) described below, etc.

The electronic power subsystem (EPS) 21,121 provides electric power to the controller 22,122, the NAD 24,124, the lidar device 26,126, the camera 28,128, the GNSS receiver 30,130, and the IMU 32,132. As will be discussed more in detail below, the electric power subsystem 21,121 can include one or more battery modules. Many different types of batteries can be used, including, for example, lithium ion batteries, nickel metal hydride batteries, and/or nickel cadmium batteries. In other embodiments, the components 22-32,122-132 of the sensor package 20,120 are provided electricity via power transmission lines of a power grid, such as those that also provide electricity to traffic signals or other roadside equipment (RSE).

The network access device (NAD) 24,124 enables the sensor package 20,120 to communicate with other remote networks via wireless carrier system 12 and/or land network 14. The NAD 24,124 can include a router, a modem, other network interface controller or module, a processor (which can be separate from the processor of the controller 22,122), and/or a memory device (which can be separate from the memory of the controller 22,122). In one embodiment, the NAD 24,124 includes a wireless communications device that enables wireless communications to be carried out. In one embodiment, the wireless communications device can include a cellular chipset or other hardware components that enable long-range wireless communications, such as cellular communications that are carried out using the wireless carrier system 12. Additionally or alternatively, the wireless communications device of the NAD 24,124 can include short-range wireless communication (SRWC) circuitry or other hardware components that enable short-range wireless communications, such as Wi-Fi™ or Bluetooth™ In some embodiments, the NAD 24,124 can include a modem and/or other hardware enabling hard-wired communications to be carried out, such as hardware that enables long-distance wired communications to be carried out. In one embodiment, the NAD 24,124 enables both wired and wireless communications. In other embodiments, the NAD 24,124 enables only wired communications or only wireless communications. Also, it should be appreciated that, according to some embodiments, the NAD 24,124 and the controller 22,122 each have a separate processor and/or memory and that, according to other embodiments, the NAD 24,124 and the controller 22,122 each shared the same processor and/or memory.

The sensor package 20,120 includes at least one sensor and, in the illustrated embodiment, includes two environment sensors—a lidar device 26,126 and a camera 28,128. The environment sensors obtain sensor information pertaining to one or more objects of the environment, and sensor data collected or otherwise obtained by an environment sensor is referred to as environment sensor data. According to other embodiments, the sensor package 20,120 may include other environment sensors, including one or more of the following: other lidar devices, other cameras, radars, passive electromagnetic sensors, and/or active electromagnetic sensors. The sensor package 20,120 also includes positional sensors that enable a position and/or orientation of the sensor package 20,120 to be determined. The sensor package 20,120 is shown in the illustrated embodiments as including the GNSS receiver 30,130 and the IMU 32,132. According to other embodiments, the sensor package 20,120 may include other positional sensors, such as one or more triangulation devices, etc.

The lidar device 26,126 is used to obtain lidar sensor data of one or more objects within the environment, which can include range and position information of one or more objects. The lidar device 26,126 emits non-visible light waves that reflect off of object(s) and then receives the reflected waves. It should be appreciated that various types of lidar devices may be used, including, for example, those manufactured by Velodyne™, such as, for example, the Alpha Prime™, the Ultra Puck™, Puck™, etc. According to at least some embodiments, the lidar device 26,126 includes a processor and memory separate from the processor and memory of the controller 22,122; however, in some embodiments, the lidar device 26,126 and the controller 22,122 may share a common processor and/or memory. Also, although only a single lidar device 26,126 for each sensor package 20,120 is shown and described, it should be appreciated that, according to some embodiments, each sensor package 20,120 can include a plurality of lidar devices.

The camera 28,128 is used to obtain image data of one or more objects within the environment, which can include color information of one or more objects. The camera 28,128 can be any suitable digital camera. According to at least some embodiments, the camera 28,128 includes a processor and memory separate from the processor and memory of the controller 22,122; however, in some embodiments, the camera 28,128 and the controller 22,122 may share a common processor and/or memory. Also, although only a single camera 28,128 for each sensor package 20,120 is shown and described, it should be appreciated that, according to some embodiments, each sensor package 20,120 can include a plurality of cameras.

The GNSS receiver 30,130 of the sensor package 20,120 includes hardware enabling the GNSS receiver 30,130 to receive GNSS signals transmitted by a constellation of GNSS satellites 50. The GNSS receiver 30,130 includes a GNSS antenna 31,131, which can be provided externally to the housing of the sensor package 20,120. In some embodiments, the GNSS receiver 30,130 may be a global positioning system (GPS) receiver that receives GPS signals from GPS satellites that are a part of the United States' GPS satellite system. GNSS receivers for use with GLONASS, Europe's Galileo system, or other global positioning system may also be used as the GNSS receiver 30,130. The GNSS receiver 30,130 uses the received GNSS signals to obtain GNSS data, which provides a location and a time. The GNSS data can be used to provide a geographical position of the sensor package 20,120 at a particular time. The time indicated by the GNSS data, which is determined through use of (or indicated by) the GNSS signals, is the particular time at which the sensor package 20,120 was located at the determined position. According to at least some embodiments, the position can be determined based on a real-time kinematic (RTK) GNSS process that uses signals received from an RTK base station. The use of the RTK GNSS enables the geographical position of the sensor package to be more accurately determined, which is particular useful when environment sensor data is being merged from different sensor packages. According to at least some embodiments, the IMU is used to provide an orientation of the sensor package 20,120 with respect to the direction of gravity. In some embodiments, the orientation of the sensor package 20,120 is used as a part of merging sensor data frames from two sensors, such as according to the method described below.

The GNSS data, the IMU sensor data, environment sensor data, or other information determined by or obtained at the sensor package 20,120 can be supplied to remote facility 16 or other remote facility, for certain purposes, such as for use as test data for one or more tests carried out at the proving grounds or other location in which the sensor package 20,120 is located. This data or information can be transmitted from the NAD 24,124 to the remote facility 16 via the land network 14 and/or the wireless carrier system 12. In some embodiments, the remote facility 16 can support an API server that enables the client device 18 (or the mobile client device 60) to view information or data collected by or determined at the sensor package 20,120.

Each of the environment sensors (e.g., the lidar device 26,126 and camera 28,128) is used to capture environment sensor data. The environment sensor data may be captured into time-divisible portions, where the sensor data is associated with a sampling time that can be represented, for example, as a timestamp or other time indicator. For example, each image (being represented by image data for each pixel within the image) obtained by the camera 28,128 is associated with a timestamp representing the time at which the image was received or sampled at the camera 28,128. Thus, according to at least some embodiments, the environment sensors may be used to obtain sensor data over a set of time, where the sensor data is divisible based on the sampling/frame rate of the sensor. The sensor data for a particular time is referred to as a sensor data frame. As used herein, a sensor data time indicator refers to a time indicator that represents the time the sensor data frame was sampled. For example, if the camera 28,128 has a sampling frequency of 60 Hz, then a time period of 1 minute yields 3,600 images or sensor data frames.

Figure 3:
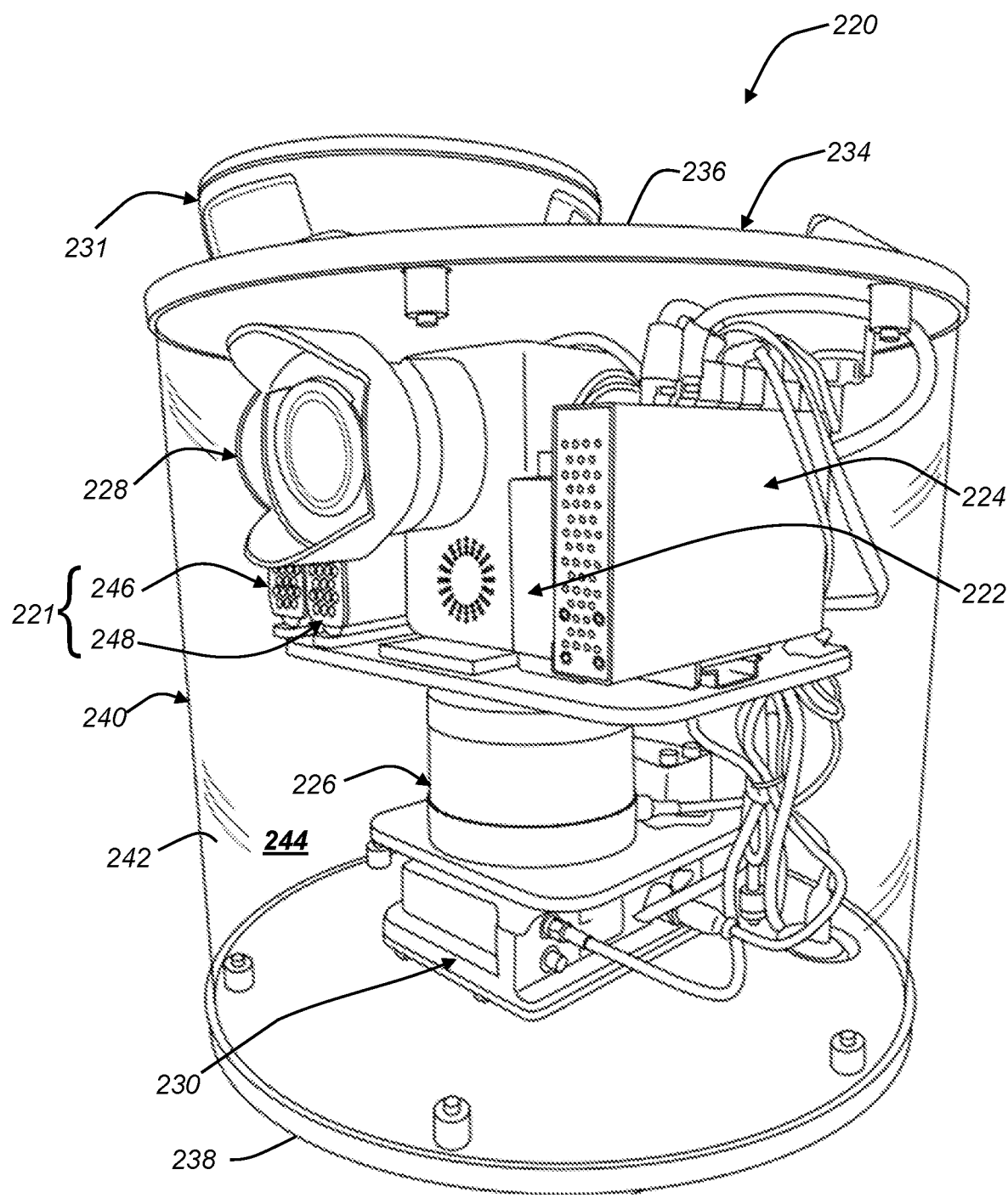
FIG. 3 illustrates a perspective view of a sensor package according to one embodiment.
Figure 4:
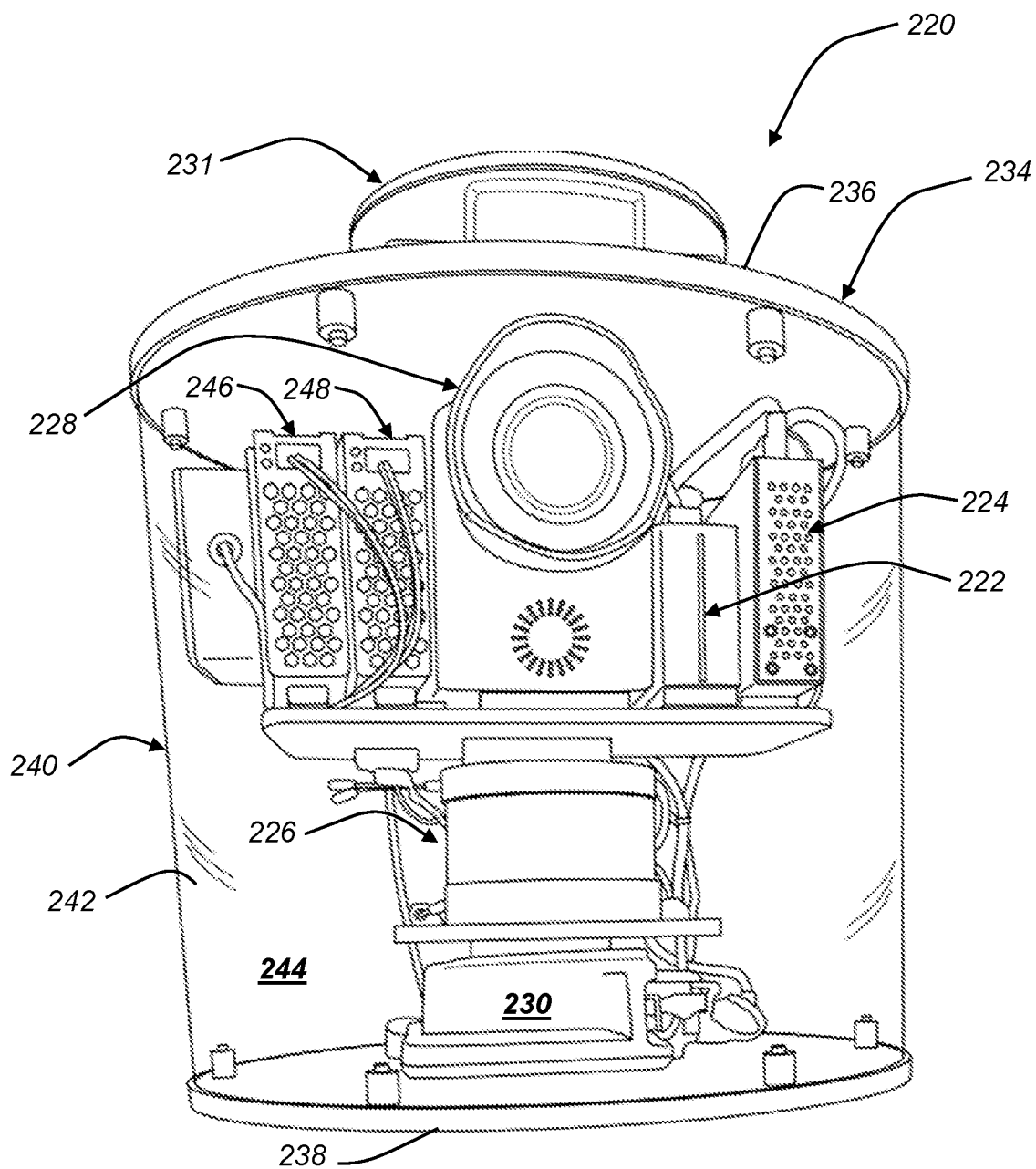
FIG. 4 illustrates another perspective view of the sensor package according to the embodiment of FIG. 3.
Figure 5:
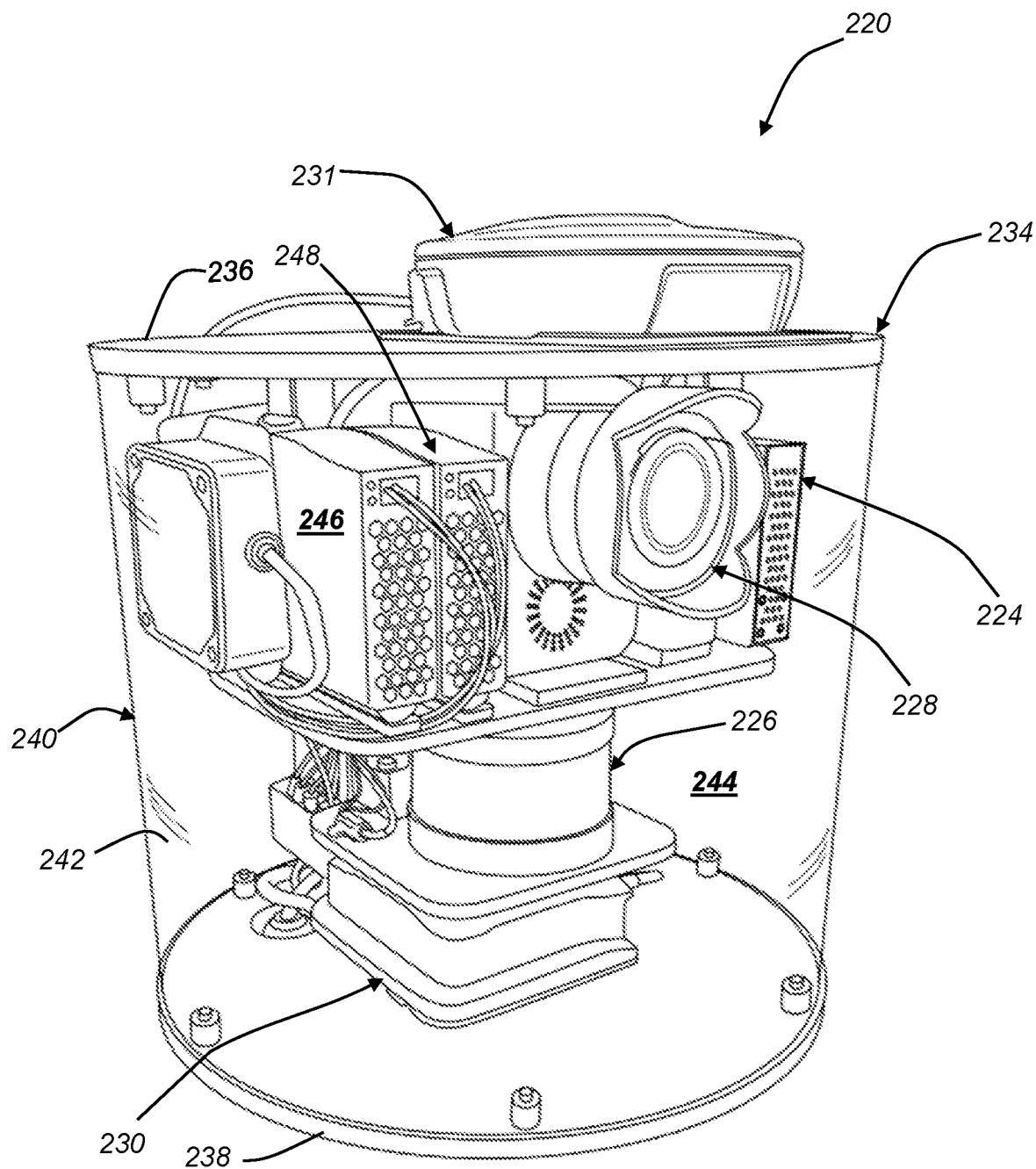
FIG. 5 illustrates yet another perspective view of the sensor package according to the embodiment of FIG. 3.

With reference to FIGS. 3-5, there are shown various perspective views of an embodiment of a sensor package 220 that can be used as either or both of the first sensor package 20 and the second sensor package 120. Furthermore, it should be appreciated that like numerals denote like components; for example, the GNSS receiver 230 of the sensor package 220 corresponds to the GNSS receiver 30 of the first sensor package 20 and the GNSS receiver 130 of the second sensor package 120. The sensor package 220 includes a climate-controlled housing 234 that houses the components 222-232, which correspond to those components 22-32,122-132 discussed above. The housing 234 is cylindrically-shaped, and includes a top portion 236, a bottom portion 238, and a side portion 240. The body portion 240 is formed of a single, curved wall 242 that is transparent. The body portion 240 has a circular cross-section and is cylindrically shaped. The top portion 236 and the bottom portion 238 are circular, and each have a diameter that is slightly greater than the diameter of the circular cross-section of the body portion 240. The top portion 236 is connected to a top edge of the body portion 240 (and curved wall 242) and the bottom portion 238 is connected to a bottom edge of the body portion 240 (and curved wall 242). The top portion 236, the bottom portion 238, and the body portion 240 form a cavity 244 that is hermetically sealed.

The top portion 236 and the bottom portion 238 are comprised of a metal or metal alloy, and the body portion 240 (or wall 242) is comprised of a transparent plastic material, such as of a certain plastic or glass. The material of the body portion 240 can be selected so as to allow electromagnetic waves (of one or more particular ranges or wavelength) to pass through without being interfered with so that, for example, incoming electromagnetic waves (e.g., light) can be detected by the lidar device 226, the camera 228, and/or other electromagnetic sensor of the sensor package 220. In other embodiments, the field of view of the lidar device 226, the camera 228, and/or other electromagnetic sensor of the sensor package 220 may be directed through another portion of the housing 234, and the material of these portions of the housing 234 can be transparent or selected so as to not interfere with the electromagnetic waves. Various materials can be used for the top portion 236, the bottom portion 238, and the side portion 240, and the various materials can be selected according to their suitability with respect to those features of the sensor package 220 described herein, such as their suitability for withstanding the environmental elements, such as precipitation, temperatures, etc.

The top portion 236 and the bottom portion 238 are securely attached to the side portion 240 in a manner so as to hermetically seal the interior of the housing 234 from the environment. According to various embodiments, the top portion 236, the bottom portion 238, the side portion 240, and/or other portion of the housing 234 can include one or more access portions, each of which can permit a component of the sensor package 220 to pass from the cavity 244 of the housing 234 to the environment. For example, as shown in FIGS. 3-5, the GNSS antenna 231 is attached to an exterior surface of the top portion 236, and one or more wires connecting the GNSS antenna 231 to the GNSS receiver 230 can be provided through an access portion. In such instances, these access portions can be hermetically sealed or otherwise sealed off from the environment so as to prevent water, dust, or other particulate matter from entering the interior of the housing 234.

In the illustrated embodiment of FIGS. 3-5, the electronic power subsystem (EPS) 221 includes a first battery module 246 and a second battery module 248, although any suitable number of battery modules 246 may be used. The battery modules 246,248 can be selected based on requirements of one or more of the components 222-232, including the controller 222 and the NAD 224. The battery modules 246,248 can each include one or more power supplies that enable power of a particular voltage to be supplied. In some of such embodiments, a power cable can pass through an access region of the housing 234 and can be connected to power supply circuitry within the cavity 244 of the housing 234. In other embodiments, the power supply circuitry can be disposed outside the housing 234 and an output of the power supply circuitry can be passed through another cable that passes through an access region of the housing 234. The power supply circuitry can include an AC/DC converter, as well as transformers or other circuitry used to provide a suitable output for the components 222-232, which can be, for example, a DC output of a particular voltage and current.

Figure 6:
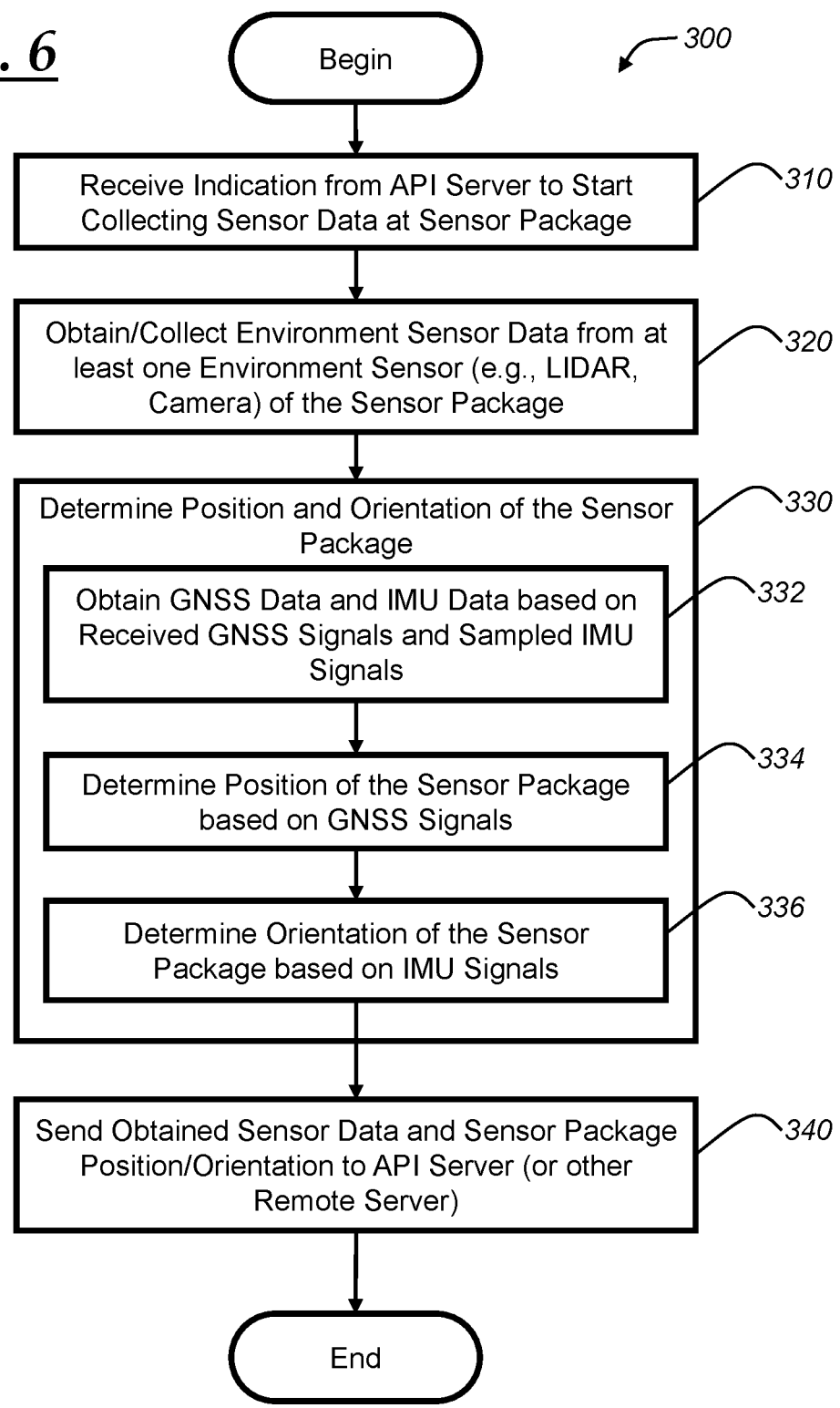
FIG. 6 depicts a flowchart of an embodiment of a method for obtaining environment sensor data and position/orientation data from a sensor package.

With reference to FIG. 6, there is shown an embodiment of a method 300 for obtaining environment sensor data and position/orientation data from a sensor package. In at least one embodiment, the method 300 is carried out by the sensor package 20, which can be located along a road, such as at a traffic signal. Although the steps 310-340 are discussed as being carried out by the sensor package 20, it should be appreciated that one or more steps or actions described below can be carried out at other devices, such as the remote servers 17, the vehicles 10,11, the client device 18, and/or the mobile client device 60 according to any technically-feasible combination. While the steps of the method 300 are described as being carried out in a particular order below, it is hereby contemplated that the method 300 can be carried out in any technically-feasible order as will be appreciated by those skilled in the art.

The method 300 begins with step 310, an indication to collect environment sensor data at the sensor package is received. In some embodiments, the indication is generated and received internally within the sensor package, such as by being programmed to continually collect the sensor data and either automatically send it to a remote device/system or store it locally until an event occurs, such as a request for the data from a remote server/device. In other embodiments, the indication to collect environment sensor data is sent from a remote facility to the sensor package 20, in response to which the sensor package may begin the data collection. For example, in one embodiment, the indication is a data collection request message that is sent to the sensor package 20 from a remote server, such as the API server (which may be implemented by the one or more servers 17). The API server receives a request from the client device 18 and, then, the API server sends the data collection request message to the sensor package 20. The data collection request message can include various information, such as one or more sensor data parameters. The sensor data parameters include a sensor identifier (i.e., an identifier that can be used to identify one sensor of the sensor package from another sensor of the sensor package), a data collection period (i.e., a period of time in which to collect data using environment sensor(s) of the sensor package 20), a data collection rate (i.e., a sampling rate or frequency with which to collect environment sensor data), and sensor-specific parameters. Exemplary sensor-specific parameters for the camera 28 include an image resolution and a focal length. Exemplary sensor-specific parameters for the lidar device 26 include a point density, laser scan frequency, laser impulse frequency, and laser power. In one embodiment, the sensor identifier can be an identifier that uniquely identifies the sensor from any other device used in the system, and can include a universally unique identifier.

In at least one embodiment, the mobile client device 60 sends the data collection request to the sensor package 20. In one embodiment, the mobile client device 60 acts as a client device that communicates with the system using the API, which is supported by the API server. A user, such as a proving grounds test user, can specify certain sensor data parameters that are to be used to collect the environment sensor data. In another embodiment in which the sensor package 20 includes short-range wireless communication (SRWC) capabilities, the mobile client device 60 establishes a SRWC connection (e.g., a Bluetooth™ connection, a Wi-Fi™ connection) with the sensor package 20 and, then, over this established SRWC connection, the mobile client device 60 sends the data collection request to the sensor package 20.

In yet another embodiment, the sensor package 20 is configured to collect environment sensor data according to one or more predetermined time periods. For example, the sensor package 20 can be configured to periodically collect environment sensor data for certain predetermined time periods. The sensor package 20 can be initially configured with these predetermined time period(s), or can receive data indicating these predetermined time period(s) from another device, such as the API server and/or client device 18. In one embodiment, the sensor package 20 receives a data collection request that causes the sensor package 20 to collect environment sensor data. In such an embodiment, the sensor package 20 can collect sensor data according to information contained within the data collection request, according to preconfigured information at the sensor package 20, or according to information contained within the data collection request and preconfigured information at the sensor package 20. The predetermined or preconfigured information can be stored in memory of the controller 22, or other memory of the sensor package 20. Also, information contained in the data collection request, or the entire data collection request message, can be stored in memory of the controller 22, or other memory of the sensor package 20. The controller 22 can use its processor to process and parse the data collection request and/or other information that is available at the sensor package (e.g., pre-configured or predetermined information stored in memory of the controller 22), and can determine one or more operations based on this information, such as whether to collect environment sensor data and/or sensor operating parameters with which to collect the data. The method 300 continues to step 320.

In step 320, environment sensor data is collected by at least one environment sensor of the sensor package. In at least some embodiments, the environment sensor data is collected by the environment sensor (e.g., camera 28, lidar device 26) in response to receiving the data collection request. The environment sensor data can be collected according to one or more sensor data parameters, which are discussed above, and which can be specified in the data collection request or predetermined or pre-stored at the sensor package 20, such as in memory of the controller 22, memory of one or more sensors of the sensor package 20, or other memory of the sensor package 20. In some embodiments, the data collection request may not specify sensor data parameters and, in such cases, default sensor data parameters can be used. Or, in some embodiments, the data collection request can indicate one or more sensor data parameters, and these one or more sensor data parameters can be used along with default sensor data parameters, such as those that are predetermined and/or pre-stored in memory of the sensor package 20, such as memory of the lidar device 26 or camera 28.

The data collection performed by the at least one environment sensor is carried out to collect or obtain the environment sensor data. The environment sensor data can indicate (such as by including or being accompanied/associated with) one or more sensor data time indicators (e.g., timestamps) that indicate collection/sampling time(s) of the environment sensor data. The environment sensor data can be processed by the environment sensor that captured the environment sensor data, and then can be sent (along with the sensor data time indicator) from that environment sensor to the controller 22 or other device or component of the sensor package 20. The environment sensor data (and the sensor data time indicator) can also be stored in memory of the sensor package 20, such as in memory of the controller 22, memory of one or more environment sensors of the sensor package 20, or other memory of the sensor package 20. In the illustrated embodiment, this step can include collecting image data using the camera 28 and/or lidar data using the lidar device 26. The method 300 continues to step 330.

In step 330, a position/orientation data of the sensor package is determined. The position/orientation data of the sensor package includes a position (e.g., a GPS latitude, longitude, elevation) and an orientation (e.g., an angle of offset relative to gravity) of the sensor package. In some embodiments, this step includes obtaining GNSS data and IMU data (step 332), determining a position of the sensor package based on the GNSS data (step 334), and then determining an orientation of the sensor package based on the IMU data (step 336). The GNSS data is obtained at the GNSS receiver 30 through the GNSS receiver 30 receiving a plurality of GNSS signals from the GNSS satellites 50. The IMU data is obtained using the IMU 32. The received GNSS signals are used to determine the position, which can be embodied in the GNSS data. The received GNSS signals are also used to determine a time indicator, which also can be embodied in the GNSS data and which is referred to as a GNSS time indicator. In at least one embodiment, the GNSS receiver 30 uses a code-based position technique to determine the position. In another embodiment, the GNSS receiver 30 uses a real-time kinematic (RTK) technique to determine the position. Use of the RTK technique enables the position to be more precisely determined compared to when using a code-based technique. The orientation is determined based on IMU data obtained by the IMU 32. For each reading of the IMU data by the IMU 32, a sensor data time indicator corresponding to the sampling/reading time of each reading/frame may be associated with the sensor data frame. Once the position and orientation are determined, the method 300 continues to step 340.

In step 340, the environment sensor data and the position/orientation data of the sensor package are sent to a device external to the sensor package (or "external device"), such as a remote computer or a client device. In at least one embodiment, the remote computer to which the environment sensor data and the position/orientation data are sent is the same computer (or at least a part of the same remote server system) as the remote computer that sent the data collection request. In some embodiments, the remote computer is the API server, which is implemented by the one or more remote servers 17 in the illustrated embodiment, and, in another embodiment, the remote computer is the client device 18. In one embodiment, the environment sensor data and the position/orientation data of the sensor package is sent to the API server using the NAD 24 and land network 14, and is received at the API server. The API server can then send the environment sensor data and/or position/orientation data of the sensor package to the client device 18. In other embodiments, it is possible to directly send the sensor data and the position/orientation data of the sensor package to the client device 18.

Also, in other embodiments, the environment sensor data and the position/orientation data of the sensor package is sent to a local computer that is separate from the sensor package. For example, in an embodiment where the sensor package includes SRWC capabilities, the environment sensor data and the position/orientation data of the sensor package can be sent to the mobile client device 60 over a SRWC connection that is established between the sensor package 20 and the mobile client device 60. In such embodiments, since the mobile client device 60 is within range of the sensor package so as to establish and maintain a SRWC connection, the mobile client device 60 is considered to be local to the sensor package and, in such a case, is referred to as a local device or local computer. In some embodiments, the environment sensor data and the position/orientation data of the sensor package is sent to both a remote computer and a local computer. The environment sensor data and/or the position/orientation data of the sensor package can be stored in memory of the remote computer, the local computer, and/or one or more client devices. The client device 18 and/or the mobile client device 60 can display the received environment sensor data and the position/orientation data of the sensor package, such as through using a graphical user interface (GUI) that is supported by the API server.

In at least some embodiments, for each sensor data frame of the environment sensor data, a time-associated position and orientation are determined. For example, the method 300 may be used to carry out numerous iterations of steps 320-330 so as to obtain a plurality of sensor data frames and a plurality of position/orientation data. Thus, processing may be carried out at the sensor package, such as before carrying out step 340, or at the external device, such as after carrying out step 340, so as to match (or time-associate) sensor data frames with position/orientation data based on the sensor data time indicator of the sensor data frame for the IMU and the environment sensor, as well as the GNSS time indicator for the position data. It should be appreciated that these various time indicators may not have exact matches, but that such environment sensor data and position/orientation data may be matched based on a proximity of the time indicators, such as by matching those sensor data frames and position/orientation data frames having the closest times.

Other suitable methods for matching the environment sensor data and position/orientation data may be used. The method 300 then ends.

Figure 7:
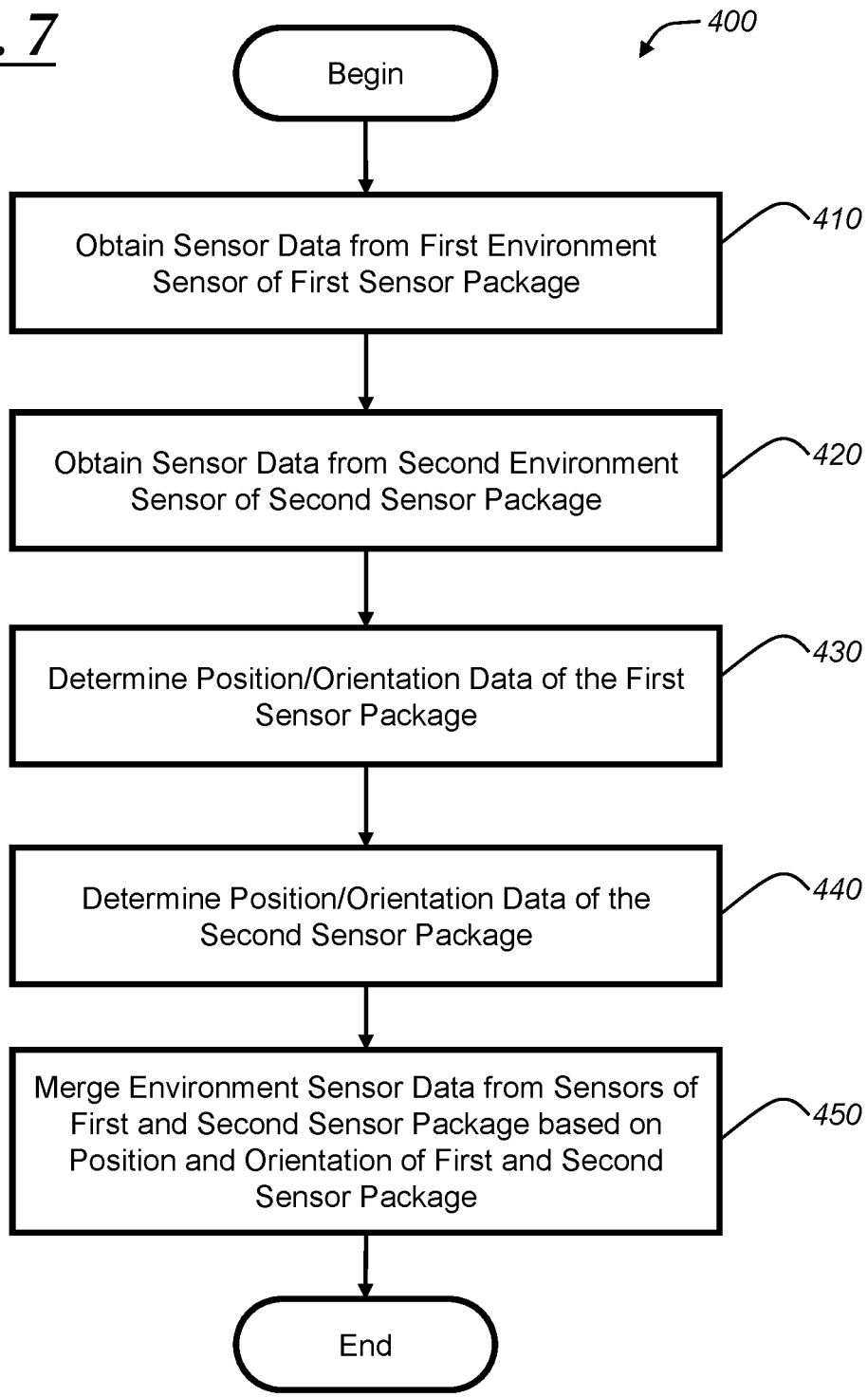
FIG. 7 depicts a flowchart of an embodiment of a method of merging sensor data from sensors of different sensor packages.

With reference to FIG. 7, there is shown a method 400 of merging sensor data from sensors of different sensor packages. According to one embodiment, the method 400 is carried out at a remote server, which can be the remote server to which the sensor data was sent in step 340 of the method 300, or may be another remote server. According to another embodiment, the method 400 may be performed at one or more of the sensor packages or other computing devices of the system. And, in some embodiments can be carried out by a combination of devices, such as where steps 410-440 are carried out at one or more sensor packages and where step 450 is carried out at a remote server.

Figure 8:
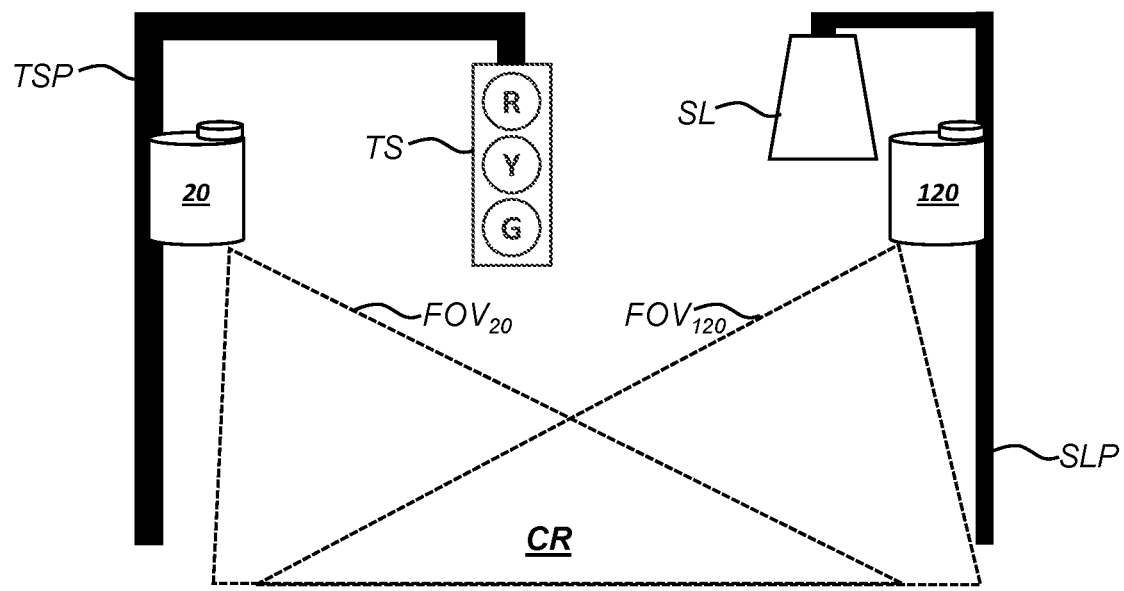
FIG. 8 is a diagrammatic view illustrating an embodiment in which the first sensor package of FIGS. 1-2 is mounted on a traffic signal pole and the second sensor package of FIGS. 1-2 is mounted on a streetlight pole such that environment sensors within the first and second sensor packages have a sensor field of view that overlaps at a common region.

With reference to FIG. 8, there is shown an embodiment in which the first sensor package 20 is mounted on a traffic signal pole TSP holding a traffic signal TS and the second sensor package 120 is mounted on a streetlight pole SLP holding a streetlight SL such that an environment sensor within the first sensor package 20 has a field of view $FOV_{20}$ that overlaps a field of view $FOV_{120}$ of an environment sensor within the second sensor package 120 at a common region CR. In one embodiment, the method 400 is carried out for merging sensor data frames from two environment devices that are the same type of sensor (e.g., lidar, radar, visible light camera), such as for merging a sensor data frame from the lidar device 26 of the first sensor package 20 with a sensor data frame from the lidar device 126 of the second sensor package 120. However, it should be appreciated that the method 400 can be carried out for merging environment sensor data obtained from different types of environment sensors and/or for merging environment data obtained from a single sensor package, such as for merging environment sensor data from camera 28 with environment sensor data from lidar device 26.

With reference back to FIG. 7, the method 400 begins with steps 410 and 420, wherein environment sensor data is obtained from an environment sensor of a first sensor package and environment sensor data is obtained from an environment sensor of a second sensor package. The environment sensor of the first sensor package is referred to as the first environment sensor and the environment sensor of the second sensor package is referred to as the second environment sensor. These steps can each be carried out as in step 320 of the method 300. In one embodiment, the first environment sensor is the lidar device 26 of the first sensor package 20 and the second environment sensor is the lidar device 126 of the second sensor package 120. The first environment sensor obtains first environment sensor data, and the second environment sensor obtains second environment sensor data. The method 400 then continues to steps 430-440.

In steps 430 and 440, position/orientation data of each of the first and second sensor packages is determined. These steps can each be carried out as in step 330 of the method 300. In one embodiment, the position of each sensor package is determined based on receiving a plurality of GNSS signals at the respective GNSS sensor of the sensor packages and then calculating a position of the sensor package. And, in one embodiment, the orientation of each sensor package is determined based on obtaining sensor data from the respective IMU of the sensor packages. The method 400 continues to step 450.

In step 450, the environment sensor data from the first sensor package and the second sensor package are merged based on the position/orientation data of the first sensor package and the second sensor package. In at least one embodiment, this step includes merging a first sensor data frame with a second sensor data frame so as to generate composite environment sensor data that provides environment sensor data representing a common region within the environment from multiple perspectives. In one embodiment, this step is carried out for merging a single sensor data frame of environment sensor data from the first environment sensor and a single sensor data frame of environment sensor data from the second environment sensor, where the sensor data frame of the first environment sensor and the sensor data frame of the second environment sensor are time-associated with one another, which means that the sensor data time indicator for each sensor data frame is within a predetermined amount of time from one another (or within a sensor data frame tolerance amount as discussed below). For example, when using a sensor data frame tolerance amount of 0.02 seconds, a time of the sensor data frame of the first environment sensor being 5:00:00.01 and a time of the sensor data frame of the second environment sensor being 5:00:00.025 is within the sensor data frame tolerance amount of 0.02 seconds since the difference is only 0.015 seconds. Sensor data frames from different sensors that are within the sensor data frame tolerance amount are referred to as paired sensor data frames (or time-associated sensor data frames). The sensor data frame tolerance can be set based on the type of sensor, the application in which the sensor is used, the sampling or frame rate of the sensor, and/or other attributes of the sensor and/or circumstances in which the method is being used. Although this step is described with respect to merging a single sensor data frame of the first environment sensor data with a single sensor data frame of the second environment sensor, it should be appreciated that this step can include repeating this process for a plurality of paired sensor data frames so as to merge a plurality of sensor data frames from the first environment sensor with a plurality of corresponding sensor data frames from the second environment sensor.

In some embodiments, such as those that include spatial environment data (e.g., lidar data or image data), this step is carried out based on the automatic merging process of lidar point-clouds described in *Automatic Merging of Lidar Point-Clouds Using Data from Low-Cost GPS/IMU Systems*, by Scott E. Budge and Kurt von Neiderhausern, Center for Advanced Imaging Lidar, Utah State University. In at least one embodiment, this step includes: obtaining a point cloud for the environment sensor data of the first environment sensor package and a point-cloud for the environment sensor data of the second environment sensor package so as to have a first point cloud for the first environment sensor and a second point cloud for the second environment sensor; then, iterating over the points of the first and second point clouds by modifying the position/orientation of the point clouds (relative to one another) to find points within the first and second point clouds that are close to one another and that likely represent the same actual point (e.g., through use of a nearest neighbor technique); and, once the positions of the point clouds are within a predetermined tolerance, then these point clouds are deemed to be aligned. Then, in some implementations, the aligned point clouds can be further processed to remove duplicated points and thin the overlap of points. For improving accuracy when carrying out this step for a plurality of sequential sensor data frames, sensor data from the IMU can be used to calculate more accurate offsets so as to provide a more accurate starting position/orientation for the paired sensor data frames. The IMU data can also be used to correct shaking of the sensor when sensor data is being obtained, such as when doing a sweep or scan using a lidar unit.

Based on the above-mentioned publication entitled *Automatic Merging of Lidar Point-Clouds Using Data from Low-Cost GPS/IMU Systems*, it has been further discovered that using a more precise GNSS receiver improves the starting position and reduces the number of iterations used to align the point clouds of the first and second sensors. Moreover, it has been further discovered that using a real-time kinematic corrected GNSS position (RTK GNSS position) gives a much better initial starting position (~10 cm), which further reduces the number of iterations. Furthermore, it has been discovered that when applying this methodology to a system having sensor package(s) that are fixed to infrastructure, such as being mounted on a traffic signal pole, the use of the RTK GNSS position reduces the number of iterations used to align the point clouds and, thus, results in a much faster calculation. Additionally, it has been discovered that using a more precise IMU enables the offsets calculated between sensor data frames to be more precise, which reduces the number of iterations needed to align the point clouds of the first and second sensors. As a further improvement, it has been found that using environment sensors that are fixed (e.g., environment sensors hung on a pole that is fixed, except for some minor movement due to wind or other elements) with respect to one another, enables use of initial positions and orientations of the environment sensors with respect to one another as a starting point for carrying out the merging/alignment process. Typically, a GNSS receiver provides a position within about 2 meters and can be used in connection with the above-mentioned publication to yield aligned lidar point-clouds using around 3,000-4,000 iterations. By using the above improvements relating to the more precise GNSS receiver and IMU, the number of iterations is drastically reduced by about 95%.

In addition to reducing the computational load by virtue of reducing the number of iterations, the computational latency may be further reduced by having a server (or other computer) with one or more graphical processing units (GPUs) process the sensor data frames so as to merge the sensor data frames, such as through use of the methodology above. In one embodiment, the one or more remote servers 17 include the one or more GPUs and use these GPU(s) to carry out the merging process discussed above. Furthermore, certain types of sensor data may be more amenable to processing using GPUs, such as lidar data or image data. Once the paired sensor data frames are merged, the method 400 then ends. However, it should be appreciated that the method 400 can be carried out a plurality of times for a plurality of paired sensor data frames. Moreover, information used as a part of aligning or merging previous paired sensor data frames may be used as a starting position and/or orientation (or as a basis for determining a starting position and/or orientation, which may further be based on IMU data) for later subsequent sensor data frames.

It should be appreciated that any one or more of the steps of the method 300 and/or 400 can be carried out a number of times, which may depend on the particular implementation used. For example, in response to receiving a data collection request, the sensor package 20 can carry out steps 320 through 340 a plurality of times so that, for example, sensor data and the position of the sensor package is continuously collected and/or determined and then sent to the remote computer.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A method for obtaining environment sensor data and position/orientation data from a sensor package, wherein the sensor package is fixed to infrastructure at or near a road, and wherein the sensor package comprises a housing that houses:
   a controller having a processor and memory storing computer instructions;
   a network access device including hardware enabling wireless communications and being communicatively coupled to the controller;
   a global navigation satellite system (GNSS) receiver communicatively coupled to the controller and to a GNSS antenna;
   an inertial measurement unit (IMU) communicatively coupled to the controller; and
   at least one environment sensor that is communicatively coupled to the controller and that is configured to collect environment sensor data of the road, and
wherein the method comprises the steps of:
   receiving an indication to collect environment sensor data at the sensor package, wherein the indication to collect environment sensor data is received as a data collection request, wherein the data collection request is received from an application programming interface (API) server that implements an API that provides a client device with access to the sensor data obtained at the sensor package, wherein the API server receives a request from the client device to collect sensor data, wherein the data collection request is sent to the sensor package in response to the received request, wherein the request received at the API server specifies one or more sensor data parameters, and wherein the data collection request includes the one or more sensor data parameters;
   collecting the environment sensor data at the sensor package using the at least one environment sensor according to the one or more sensor data parameters;
   receiving GNSS signals at the sensor package using the GNSS receiver;
   receiving signals from a real-time kinematic (RTK) GNSS base station;
   obtaining IMU data using the IMU;
   determining position/orientation data that includes position data and orientation data, wherein the position data is based on the received GNSS signals and the signals from the RTK GNSS base station, and wherein the orientation data is based on the IMU data; and
   sending the environment sensor data and the position/orientation data of the sensor package to an external device using the network access device, wherein the environment sensor data includes at least one sensor data frame, and wherein the sensor data frame is matched with position/orientation data based on a time associated with collecting the sensor data frame and the position/orientation data.

2. The method of claim 1, wherein the sensor package includes the GNSS antenna that is communicatively coupled to the GNSS receiver so that the GNSS receiver receives the GNSS signals via the GNSS antenna, and wherein the GNSS antenna is located outside of the housing.

3. A method for merging sensor data from sensors of a first sensor package and a second sensor package, wherein the first sensor package and the second sensor package each is fixed to infrastructure at or near a road and each comprises a housing that houses:
   a controller having a processor and memory storing computer instructions;
   a network access device including hardware enabling wireless communications and being communicatively coupled to the controller;
   a global navigation satellite system (GNSS) receiver communicatively coupled to the controller and to a GNSS antenna;
   an inertial measurement unit (IMU) communicatively coupled to the controller; and
   at least one environment sensor that is communicatively coupled to the controller and that is configured to collect environment sensor data of the road, and
wherein the method comprises the steps of:
   receiving an indication to collect environment sensor data, wherein the indication to collect environment sensor data is received as a data collection request, wherein the data collection request is received from an application programming interface (API) server that implements an API that provides a client device with access to the sensor data obtained at the sensor package, wherein the API server receives a request from the client device to collect sensor data, wherein the data collection request is sent to the sensor package in response to the received request, wherein the request received at the API server specifies one or more sensor data parameters, and wherein the data collection request includes the one or more sensor data parameters;
   collecting first environment sensor data using the at least one environment sensor at the first sensor package, wherein the first environment sensor data includes a first sensor data frame;
   receiving signals at the first sensor package and the second sensor package from one or more real-time kinematic (RTK) GNSS base stations;
   collecting second environment sensor data using the at least one environment sensor at the second sensor package, wherein the second environment sensor data includes a second sensor data frame, wherein the first sensor data frame and the second sensor data frame are time-associated with one another, wherein one or both of the first environment sensor data and the second environment sensor data is collected according to the one or more sensor data parameters;

determining first position/orientation data that includes first position data and first orientation data for the first sensor package, wherein the first position data is based on GNSS signals received at the first sensor package and the signals from the one or more RTK GNSS base stations, and wherein the first orientation data is based on IMU data received at the first sensor package;

determining second position/orientation data that includes second position data and second orientation data for the second sensor package, wherein the second position data is based on GNSS signals received at the second sensor package and the signals from the one or more RTK GNSS base stations, and wherein the second orientation data is based on IMU data received at the second sensor package; and merging the first sensor data frame with the second sensor data frame based on the first position/orientation data and the second position/orientation data so as to generate composite environment sensor data that provides environment sensor data representing a common region within the environment from multiple perspectives.

4. A sensor package having a housing that houses:

a controller having a processor and memory storing computer instructions;

a network access device including hardware enabling wireless communications and being communicatively coupled to the controller;

a global navigation satellite system (GNSS) receiver communicatively coupled to the controller and to a GNSS antenna;

an inertial measurement unit (IMU) communicatively coupled to the controller; and at least one environment sensor that is communicatively coupled to the controller and that is configured to collect environment sensor data of the road, and wherein the computer instructions, when executed by the processor, cause the sensor package to:

receive an indication to collect environment sensor data at the sensor package, wherein the indication to collect environment sensor data is received as a data collection request, wherein the data collection request is received from an application programming interface (API) server that implements an API that provides a client device with access to the sensor data obtained at the sensor package, wherein the API server receives a request from the client device to collect sensor data, wherein the data collection request is sent to the sensor package in response to the received request, wherein the request received at the API server specifies one or more sensor data parameters, and wherein the data collection request includes the one or more sensor data parameters;

collect the environment sensor data at the sensor package using the at least one environment sensor according to the one or more sensor data parameters;

receive GNSS signals at the sensor package using the GNSS receiver;

receive signals from a real-time kinematic (RTK) GNSS base station;

obtain IMU data using the IMU;

determine position/orientation data that includes position data and orientation data, wherein the position data is based on the received GNSS signals and the signals from the RTK GNSS base station, and wherein the orientation data is based on the IMU data; and send the environment sensor data and the position/orientation data of the sensor package to an external device using the network access device, wherein the environment sensor data includes at least one sensor data frame, and wherein the sensor data frame is matched with position/orientation data based on a time associated with collecting the sensor data frame and the position/orientation data.

* * * * *